April 28, 1970 F. GROSS 3,508,576

PNEUMATIC CHECK VALVES

Filed June 1, 1967

United States Patent Office 3,508,576
Patented Apr. 28, 1970

3,508,576
PNEUMATIC CHECK VALVES
Friedrich Gross, Harenberg, Germany, assignor to Westinghouse Bremsen- und Apparatebau GmbH, Hannover, Germany, a company of Germany
Filed June 1, 1967, Ser. No. 642,963
Claims priority, application Germany, Dec. 15, 1966,
W 42,978
Int. Cl. F16k 15/14
U.S. Cl. 137—525
2 Claims

ABSTRACT OF THE DISCLOSURE

A pneumatic check valve comprising a circular base constituting a seal ring, a valve member having a diameter smaller than that of said base and positioned above the latter and said base and valve member being connected by a plurality of spaced-apart strips functioning as springs to normally maintain said valve member closed upon a valve seat, said base, valve member and strips being integrally formed of rubber or other suitable elastic material.

---

The invention relates to pneumatic check valves of the type wherein a spring force is applied in the direction of the closing of the valves.

The presently known valves of this type include a closing plate, either shaped as a cone or a sphere, and loaded with a coil-type spring for effecting closure. In the known arrangement, the weight proper of the closing assembly can successfully regulate the closing. However, the existing apparatus has many deficiencies in certain specific uses. For instance, when attempting to purify the exhaust fumes of vehicles, fresh air is brought into the exhaust chambers of the motors to bring about a delayed combustion, which calls for a low pressure of air only. Therefore, the fresh air conduits and the exhaust chambers must be separated by a check valve which will securely prevent the return flow of the exhaust fumes into the fresh air conduits. Because the fresh air pressure is generated by an engine-driven blower at the expense of the driving performance, there is, therefore, the basic requirement especially for small and medium vehicles, that the flow of the fresh air past the check valve be as free as possible of any throttling effect. Furthermore, the shape of such valves must be such to assure the most economical recovery as well as the highest reliability in use. These features have not been present in the previously known check valves.

The present invention provides an arrangement for decreasing the throttling effect of the check valve below the presently established values and at the same time, by a highly simple design, to decrease the cost and improve the reliability of such valves in use.

More particularly, the invention comprises a check valve which is molded in one piece from rubber or other suitable elastic material and which includes a reinforced valve plate, a seal ring or bottom ring placed opposite the preceding in the direction of the air flow, and a plurality of strips or straps formed to provide bent springs and which are connected to the ring and to the valve plate either in a conical or cylindrical pattern. It is further proposed that a metal plate be provided to reinforce the valve plate and that the strips may be provided with narrowed cross cuts at the points of the bends.

Referring to the drawings, wherein similar reference characters refer to similar parts throughout the several views.

Figure 2:
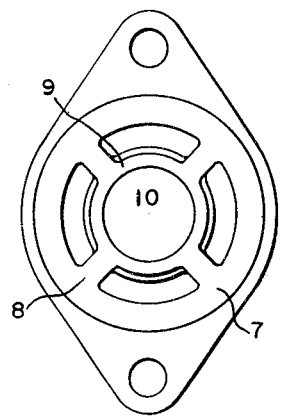
FIG. 2 is a plan view of the parts of FIG. 1 after the removal of the lower frame section.
Figure 1:
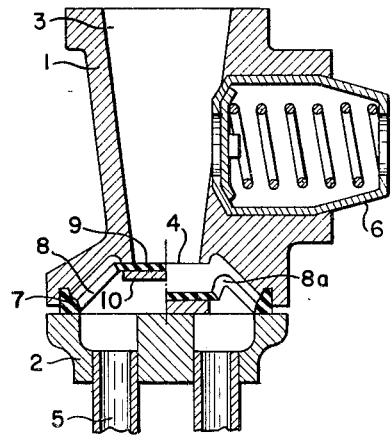
FIG. 1 is an axial sectional view of one form of check valve in an arrangement for the purification of engine exhaust gases.

The examples of the practical applications, shown in FIGS. 1 and 2, of the valve arrangements comprise frame sections 1 and 2 joined together by the flange and the counter-flange, and between which is mounted the novel check valve of the present invention. In the conduit 3 of the frame section 1, at the lower end of which is provided a valve seat 4, a continuous supply of fresh air flows in the direction of the arrow. Such air flows past the opened check valve (FIG. 1, right side), and through several connecting pipes 5 to the motor exhaust chambers, not shown. With the check valve closed (FIG. 1, left side), such air may be exhausted to atmosphere past a pressure-limiting valve 6 placed in the frame section 1.

The novel check valve of the invention comprises a seal ring 7, a plurality of strips 8 and a valve plate 9, all of these being integrally molded from rubber or other suitable elastic material. To reinforce the valve plate 9, a metal disc 10 is attached to it, either by vulcanization or by any other suitable method.

The foregoing parts are so designed as to combine in the novel check valve, three construction features and their functions. Firstly, by the means of the ring 7, the check valve is mounted as shown, with the seal ring 7 sealed between the frame sections 1 and 2. Secondly, the valve includes plates 9 and 10, the plate 9 being adapted to close upon the seat 4. Thirdly, the strips 8 serve as the reverse drive springs as well as supports for the valve plates 9 and 10. As required of all mass produced articles, the novel check valve will be simple, inexpensive and free of defects.

A feature of the invention resides in the reduction of the throttling effect during operation. This is achieved in the following manner: the elastic strips 8 serving as the reverse drive springs are bent by the opening of the valve plates 9 and 10 as is shown at 8a in FIG. 1. It is known that the elastic force of the bent strips is smaller when the bending is more pronounced. Consequently, the practical application of this phenomenon results in the preceding case in the desired advantage, which means that in order to keep the once opened valve plates down against the initial opening energy, only a substantially lower air energy is needed. Due to this, the throttling action of the check valve is materially reduced. With the previously known coil-type spring, the contrary holds true, because the spring path (the valve path) increases with the spring force (throttling of the valve passage).

Figure 3:
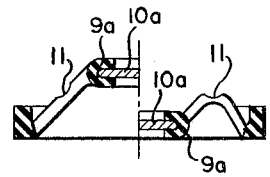
FIG. 3 is a sectional view of a modified form of check valve.
Figure 4:
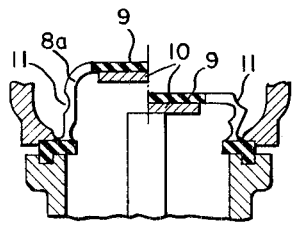
FIG. 4 is a sectional view of a further modified form of check valve.

As is shown in FIG. 3, the connection between the valve plate 9a and the reinforced metal plate 10a can be obtained by other methods. The strips 8 do not have to be arranged conically as they are in FIG. 1, but could be placed in the form of a cylinder as in the case of the strips 8a in FIG. 4.

At the points of bending the strips may be provided with narrowed cross cuts 11 (FIGS. 3 and 4), in order to further decrease the elastic force of the strips.

Figure 5:
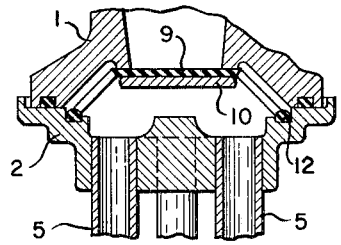
FIG. 5 is a sectional view of still another form of check valve.

In an additional application, FIG. 5, it is shown that the bottom ring 12 does not have to be a seal ring. It can also be formed as a bottom ring 12 which may be received in a suitable groove of the frame section.

What is claimed is:

1. In combination, a frame having a first section providing a fluid inlet and a second section providing a fluid outlet, said first section having a valve seat, and a check valve for allowing fluid flow from the inlet to the outlet but preventing fluid flow from the outlet to the inlet, said check valve comprising a seal ring forming a circular base positioned between said sections, a circular and flat valve member having a diameter smaller than that of said seal ring and spaced above said ring and normally engaging said valve seat, a plurality of spaced-apart flat strips extending radially from said valve member and interconnecting the latter with said seal ring, said ring, valve member and strips being integrally formed of elastic material, said radial strips being constructed and arranged to bend intermediate their ends upon opening of said valve member in response to an initial pressure force and thereafter to be retained bent in response to a second pressure force less than said initial pressure force whereby the valve member is retained open without tendency to close and throttle fluid flow through said valve so long as the force acting on said valve member is not less than said second pressure force, a metal reinforcing plate secured to said valve member, and a stop member carried by said second section and spaced below said valve member and axially aligned therewith for limiting the movement of said valve member away from said seat.

2. The combination as set forth in claim 1 wherein said strips are provided with cut-away portions intermediate the ends thereof to provide weakened areas.

References Cited

UNITED STATES PATENTS

| 2,629,793 | 2/1953 | Ponstingl | 251—331 X |
| 2,895,497 | 7/1959 | Jones | 251—331 X |
| 2,936,998 | 5/1960 | Loepsinger | 251—331 |
| 3,064,935 | 11/1962 | Collins | 251—331 X |
| 2,174,742 | 10/1939 | Groeniger | 137—525 X |
| 2,926,686 | 3/1960 | Gheen | 137—525 X |
| 3,029,063 | 4/1962 | Moen | 251—358 X |
| 3,077,205 | 2/1963 | Butterworth | 137—525 |
| 3,084,707 | 4/1963 | Frye | 137—525 X |
| 3,131,646 | 5/1964 | Parrott | 137—525 X |
| 3,310,277 | 3/1967 | Nielsen et al. | 251—358 X |

FOREIGN PATENTS

| 759,110 | 9/1953 | Germany. |

WILLIAM F. O'DEA, Primary Examiner

D. J. ZOBKIW, Assistant Examiner

U.S. Cl. X.R.

137—512; 251—331, 358